United States Patent [19]

Maarten

[11] Patent Number: 4,860,527
[45] Date of Patent: Aug. 29, 1989

[54] MOWING MACHINE

[75] Inventor: Koorn Maarten, JC Vlaardingen, Netherlands

[73] Assignee: C. van der Lely, N.V., Maasland, Netherlands

[21] Appl. No.: 119,709

[22] Filed: Nov. 12, 1987

[30] Foreign Application Priority Data

Nov. 12, 1986 [NL] Netherlands ............... 8602865

[51] Int. Cl.⁴ .................. A01D 34/66; A01D 69/06
[52] U.S. Cl. ................................... 56/13.6; 56/6
[58] Field of Search ........................ 56/6, 13.6

[56] References Cited

U.S. PATENT DOCUMENTS

| | | | |
|---|---|---|---|
| 3,931,859 | 1/1976 | van der Lely | 56/13.6 |
| 4,197,692 | 4/1980 | Wieber | 56/13.6 |
| 4,253,294 | 3/1981 | Zweegers | 56/13.6 |
| 4,299,077 | 11/1981 | Wattron | 56/13.6 |
| 4,428,181 | 1/1984 | van Staveren | 56/13.6 |
| 4,466,234 | 8/1984 | Sasaki | 56/13.6 |
| 4,497,161 | 2/1985 | Vissers et al. | 56/13.6 |
| 4,653,253 | 3/1987 | Voler et al. | 56/13.6 |
| 4,679,384 | 7/1987 | van der Lely | 56/13.6 |
| 4,719,742 | 1/1988 | Ermacora et al. | 56/13.6 |
| 4,720,964 | 1/1988 | Ermacora et al. | 56/13.6 |

FOREIGN PATENT DOCUMENTS

| | | |
|---|---|---|
| 0009134 | 4/1980 | European Pat. Off. . |
| 0065809 | 12/1982 | European Pat. Off. . |
| 0118952 | 9/1984 | European Pat. Off. . |
| 1782761 | 10/1972 | Fed. Rep. of Germany . |
| 7805731 | 11/1979 | Netherlands . |

Primary Examiner—Paul J. Hirsch
Attorney, Agent, or Firm—Robert A. Miller

[57] ABSTRACT

A mowing machine comprising at least three mower members which are arranged rotatably about substantially vertical axes on a supporting beam containing drive means. The drive means includes a rotating torsion shaft which is driven at both ends thereof and carries gears for driving the mower members.

21 Claims, 3 Drawing Sheets

MOWING MACHINE

BACKGROUND OF THE INVENTION

The invention relates to a mowing machine comprising at least three mower members which are arranged rotatably about substantially vertical axes on a supporting beam having accommodated therein drive means for driving the mower members. The supporting beam, during operation, extends substantially transversely to the direction of operative travel. The drive means are driven, near the two ends of the supporting beam, by means of mechanically intercoupled drive shafts.

A mowing machine of this type is disclosed in the Netherlands Patent Specification No. 171,955, which describes a disc mower comprising mowing discs provided above a supporting beam, the two outermost mowing discs including a drum-shaped crop guide. Above, and parallel to the supporting beam, there is disposed a main drive shaft which is connected via gear wheels to two secondary drive shafts. Each secondary drive shaft is accommodated in one of the drum-shaped crop guides and is connected to an outermost mowing disc. Thus, the two outermost mowing discs on the supporting beam are driven. A series of meshing gear wheels is arranged in the supporting beam in such a manner that each one of the other mowing discs is driven from one of the secondary drive shafts. Preferably, the mowing disc which relative to the hauling vehicle, is the outermost disc, is driven via on of the secondary drive shafts and the remaining mowing discs are driven via the other such drive shaft. The reason for this is that the mowing disc most remote from the hauling vehicle is loaded to the highest extent due to the presence of the crop guide in the thick of the crop.

SUMMARY OF THE INVENTION

The object of the invention is to provide a mowing machine wherein the power supplied to the mower members is distributed optimally over the two secondary drive shafts. To this end, the drive means include a torsion shaft which is capable of rotating, extends through the supporting beam and carries gear wheels for driving the mower members. The use of a torsion shaft, extending in the longitudinal direction of the supporting beam provides for all mower members being flexibly interconnected. A section of the torsion shaft, functioning as a torsion spring, is provided between each pair of interconnected, adjacent mower members. This flexible interconnection renders it possible for all the mower members to be intercoupled, while permitting the drive means at the two ends of the supporting beam to be driven by means of secondary drive shafts which are intercoupled mechanically, i.e. non-flexibly. Since the entire row of mower members is flexibly intercoupled, the extent to which each mower member is driven from either the one or the other secondary drive shaft will depend upon the load carried by the furthest removed mower members. Thus, an optimum force distribution is obtained automatically.

It will be obvious that, when gear wheels are used for intercoupling the mower members, as described in Netherlands Patent Specification No. 171,955, a non-flexible connection between the mower members is obtained, which precludes driving a mower member via both secondary drive shafts.

According to a further feature of the invention, the torsion shaft may have an out-of-round cross-section and the gear wheels which are fitted slidably on the torsion shaft are provided with an appropriately shaped center hole. This renders it possible to slide the torsion shaft axially the gear wheels and relative to the supporting beam and, thereby remove the shaft from the supporting beam. For example, the torsion shaft may be of a square cross-section with a thickness that permits sufficient power to be transferred, while providing sufficient flexibility.

In accordance with a further feature of the invention, the supporting beam may be located just above the soil during operation and the mower members may be provided with discs arranged above the supporting beam. For example, the discs may be of a circular or oval shape and may have a somewhat upwardly directed convex form. One or a plurality of cutters may be mounted on the periphery of the discs. In addition, according to the invention, the drive of the torsion shaft may be effected via the two outermost mower members arranged on the supporting beam. The power supplied is then passed to the torsion shaft via each of the two mower members and the gear wheels, by means of which the mower members are connected to the torsion shaft, so that the torsion shaft need not be engaged separately in order to be driven.

In accordance with a further feature of the invention, the outermost mower members may be provided with upwardly extending drums accommodating the secondary drive shafts for driving the torsion shaft. In this connection, a "drum" should be understood to mean a crop guide which may have a variety of shapes and, in particular, may be provided with means arranged on its circumferential surface area for exerting a force on the crop during rotation. The drums may be of a substantially cylindrical shape, although other shapes are possible as well. Consequently, the word "drum" should be interpreted broadly.

In addition, in accordance with the invention, the supporting beam may be connected to the rest of the frame of the mowing machine by means of the two secondary drive shafts, which also secondary drive the torsion shaft. Due to the presence of two drive shafts, it is possible, at least when the shafts are adequately supported by bearings to connect the supporting beam to the rest of the mowing machine frame without the use of additional attachment means.

In accordance with a further feature of the invention, the drive may be effected via a main drive shaft which extends substantially parallel to the supporting beam and drives the two secondary drive shafts positioned substantially perpendicularly to the main drive shaft, each of which secondary drive shafts drives the torsion shaft near an end of the supporting beam.

In accordance with a further feature of the invention, the secondary drive shafts may include a flexible coupling, such as a universal joint and/or a joint provided with flexible material and/or a joint having portions which are axially slidable relative to each other. Such a flexible connection may be of importance in order to give the supporting beam as it moves over the soil, some freedom of movement during operation or to permit a less accurate positioning of the supporting beam with respect to the rest of the frame.

According to the invention, the main drive shaft may be driven via gear wheels located between the connections to the secondary drive shafts, wherein the main drive shaft may consist of two sections which are substantially in alignment and are located on both sides of the location where the main drive shaft is engaged via gear wheels. It is alternatively possible to drive the main drive shaft from a position near its end.

In accordance with a further feature of the invention, the machine may be provided, in addition to a mowing implement, with a crop processing implement, e.g. a conditioner. Such an implement can exercise a beating action on the crop, thereby crushing same, which facilitates drying.

In accordance with a further feature, drum-shaped crop guides may be mounted on the outermost mower members and, taken in the lateral direction of the machine, the crop processing implement may be shorter than the length of the supporting beam. By means of the crop guides, the crop is directed slightly inwardly, as a result of which the crop processing implement may be of a somewhat shorter length than that of the supporting beam. By means of further crop guiding members, such as swath boards, the mown and optionally processed crop can ultimately be deposited on the soil in a narrow strip (swath).

In addition, in accordance with the invention, a frame portion may be provided with wheels, in which frame portion the supporting beam is suspended capable of movement, the mowing machine including means for hitching same to a tractor. In such a special support for the mowing machine, a mowing implement of a considerable length is usually employed, in which connection a supporting beam that is driven from two ends can be particularly useful.

In accordance with a further feature of the invention, the supporting beam is assembled from sections which are arranged against each other in the longitudinal direction of the supporting beam, a number of such sections being drive units for the mower members. A particularly advantageous construction of a mowing implement assembled from such units is obtained when, in accordance with a further feature of the invention, the sections are kept together by means of a tensile rod extending through all of said sections.

For relatively large mowing machines, to which the present invention relates in particular, it is of the utmost importance that such an implement be down for repairs for as little time as possible during its period of operation. Due to the construction comprising modules which can be replaced as units, it is possible to carry out a repair rapidly by replacement. For this purpose, in accordance with a feature of the invention, the tensile rod and the torsion shaft, both parallel to and extending through the sections of the supporting beam, are removable, so that the seconds of the supporting beam are detachable and replaceable individually.

For a better understanding of the invention and to show how the same may be carried into effect, reference will now be made, by way of example, to the accompanying drawings illustrating some embodiments of a mowing machine according to the invention.

DESCRIPTION OF THE PREFERRED EMBODIMENTS

Figure 1:
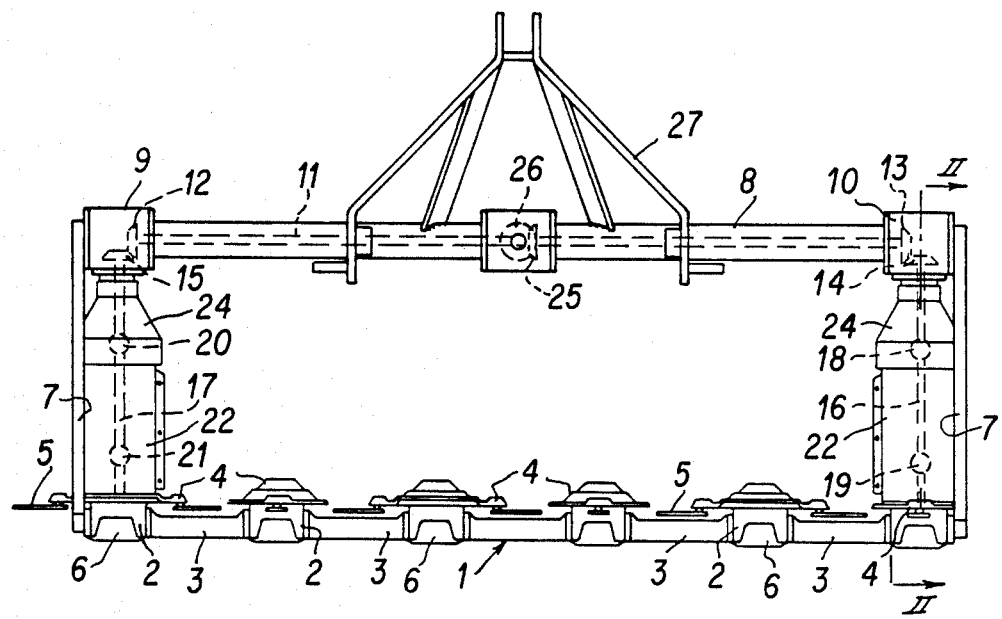
FIG. 1 shows a first embodiment of a mowing machine according to the invention.
Figure 3:
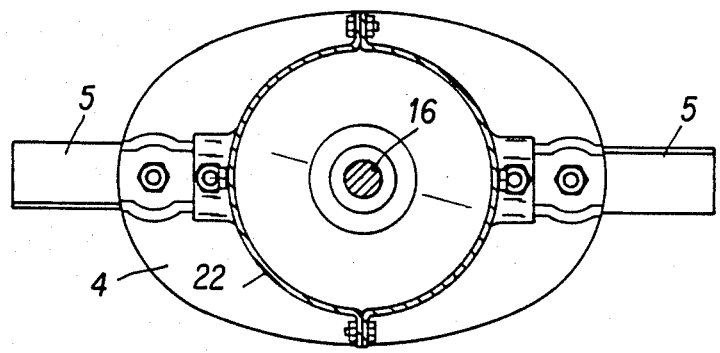
FIG. 3 is a cross-sectional view taken on the line III—III in FIG. 2.

In the drawings, which give only a schematic rendering of the embodiments, corresponding component parts have been given the same reference numerals.

The mowing machine of FIG. 1 includes a supporting beam 1 which is assembled from a plurality of adjoining sections 2, 3. Each of the sections 2 is fitted at its upper side with a mower member 4 capable of rotation about a substantially upwardly directed shaft. The mower member 4 includes a disc-shaped portion having at its outer periphery one or more knives 5. In addition, each of said sections 2 of the supporting beam 1 is provided with a slide shoe 6, which slides over the soil during operation.

In addition, the mowing machine is provided with a frame 7 which is connected to the two ends of the supporting beam 1 and extends rearwardly and thereafter upwardly from said connecting points, a hollow tube 8 constituting part of the said frame. The hollow tube 8 has both its ends connected to gear boxes 9, 10, which are mounted rigidly in said frame 7. A main drive shaft 11, which at both ends is provided with a bevel gear wheel 12, 13, each of which is accommodated in one of the gear boxes 9, 10 is located inside the said hollow frame tube 8. The said bevel gear wheels 12, 13 mesh with respective bevel gear sheels 14, 15 mounted on respective secondary drive shafts 16 and 17. Said secondary drive shafts 16, 17, whose other ends are connected to the two outermost mower members 4, are each divided into three sections by means of universal joints 18, 19, 20 and 21.

Figure 2:
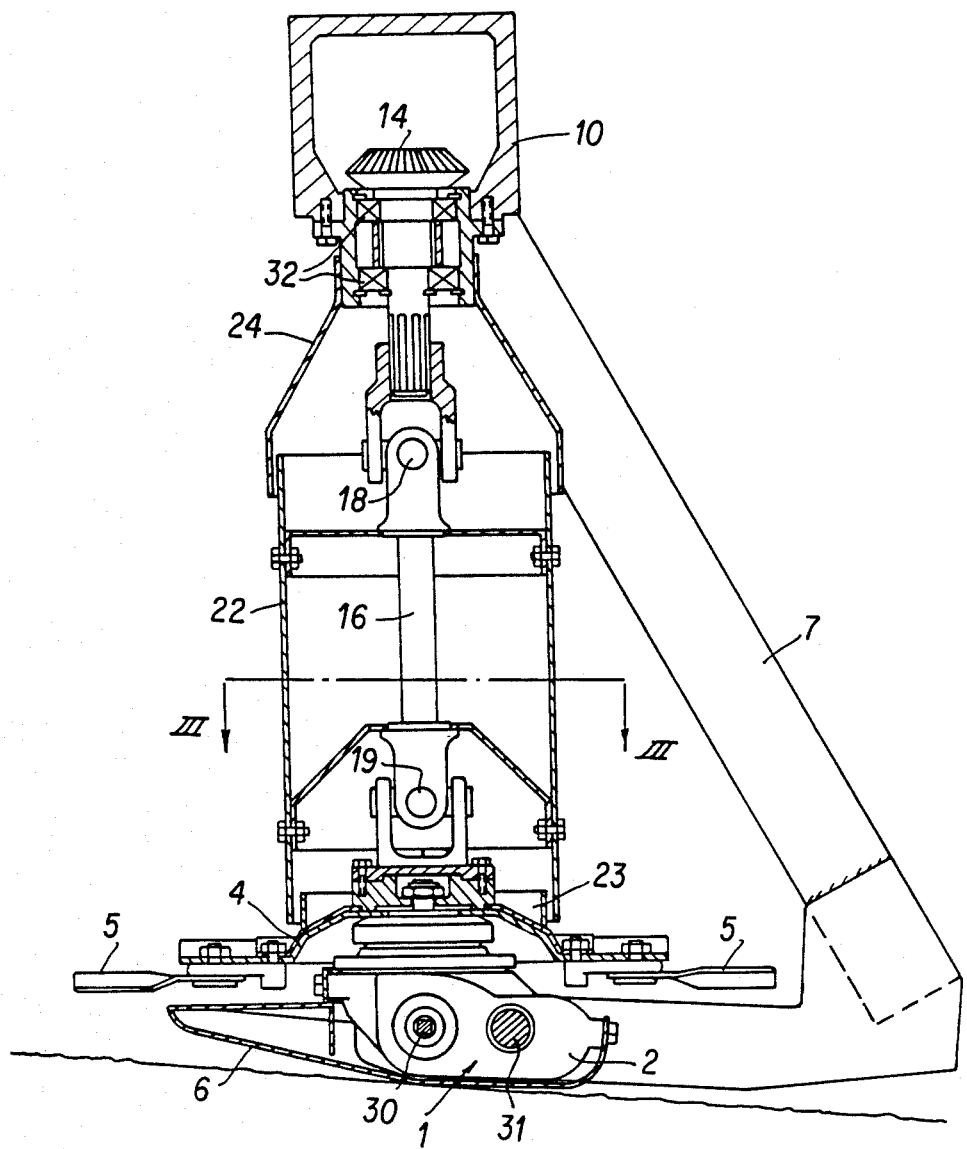
FIG. 2 is a cross-sectional view taken on the line II—II in FIG 1.

As is apparent from FIG. 2, the universal joints 18, 19 are single ones in this embodiment. A crop guide member 22, in the shape of a substantially cylindrical drum, is connected to the middle section of the drive shaft 16, 17. The said drum-shaped crop guide member 22 rotates along with the drive shaft 16 and hence with the mower member 4, which is provided with an edge 23 that is contiguous to the drum-shaped crop guide member 22. At its upper side, the drum-shaped crop guide member 22 is contiguous to a screening hood 24 fitted to the frame 7.

A bevel gear wheel 25, by which the main drive shaft can be driven, is mounted on the main drive shaft 11. To that end, the bevel gear wheel 25 meshes with a gear wheel 26 which is connected, for example, via the necessary intermediate shafts to the power take-off shaft of a tractor. A trestle 27 attached to the hollow tube 8 of the frame 7 provides the means to hitch the mowing machine to a tractor.

As has been described in the foregoing, the two outermost mower members 4 of the supporting beam 1 are driven via the main drive shaft 11 and the two secondary drive shafts 16 and 17. The supporting beam 11 accommodates a torsion shaft 30 (FIG. 2) which has a substantially square cross-section and extends substantially through the entire supporting beam. In each of the sections 2 of the supporting beam 1, the torsion shaft 30 is provided with a gear wheel, which has a square center-hole corresponding to the cross-section of the torsion shaft 30. Each gear wheel is mounted on the torsion shaft so that it might slide in the longitudinal direction but is rigidly secured against rotation. The gear wheel in each of the sections 2 of the supporting beam 1 drives the mower member 4 mounted on the relevant section 2. Consequently, all the mower members 4 are interconnected by means of torsion shaft 30 in a flexible manner, i.e. the torsion shaft 30 functions as a torsion spring between every two adjacent mower members. The use of this flexible connection allows for direct drive of the two outermost mower members, driving each of the further mowing members via the outermost mower members in dependence on the load distribution of the mowing machine.

The component sections 2, 3 of the supporting beam are kept together by a tensile rod 31 (FIG. 2) which extends through recesses in each of said sections 2, 3 and is provided at its ends with thread, so that by tightening nuts provided thereon the component sections 2, 3 are drawn up against each other and hence constitute one integral whole. In addition, the tensile rod 31 can extend through sections of the frame 7, so that the supporting beam 1 is fixed in the frame 7.

Although in FIG. 1 there is shown a trestle 27 for coupling the mowing machine to either the rear or front of a tractor, the mowing machine may alternatively be provided with wheels and be drawn by a hauling vehicle or it may be mounted in an implement in which there are, for example, also provided means for processing the mown crop. In this use, the main drive shaft 11 may alternatively be driven near one of its ends.

Figure 4:
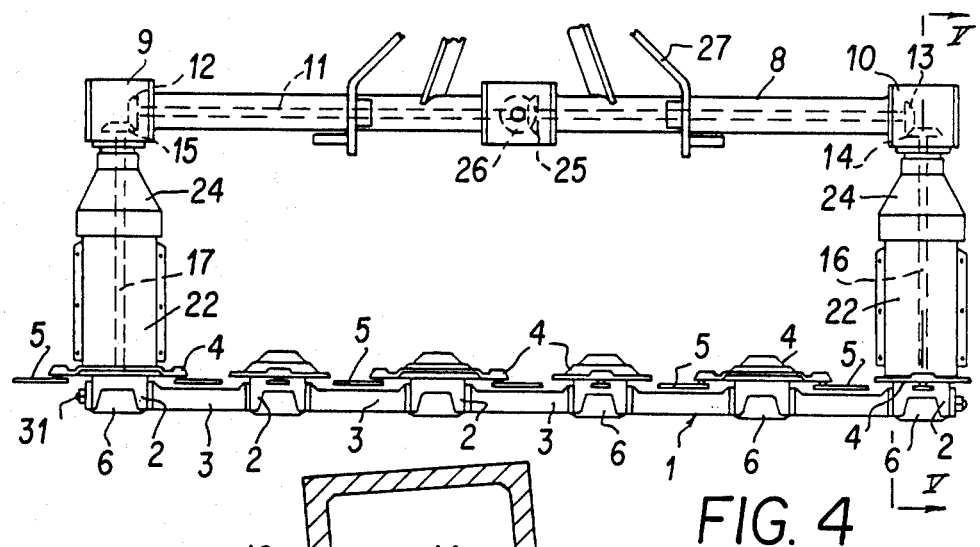
FIG. 4 illustrates a second embodiment of an implement according to the invention.
Figure 5:
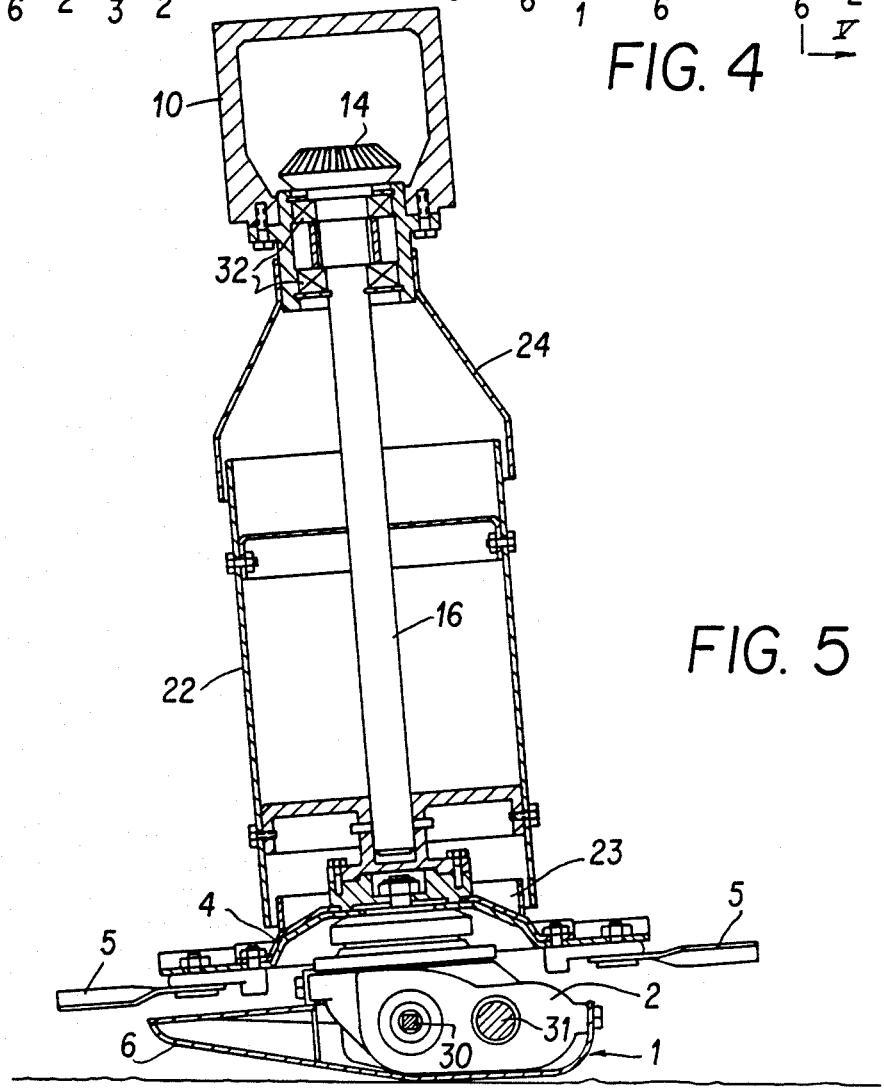
FIG. 5 is a cross-sectional view taken on the line V—V in FIG. 4.

The embodiment shown in the FIGS. 4 and 5 differs from the one described in the foregoing by the absence of universal joints in the drive shafts 16, 17. In addition, there are lacking frame portions to couple the supporting beam 1 to the superjacent portion of the frame, i.e. the hollow tube 8. The supporting beam 1 is mounted only by means of drive shafts 16, 17 which are bearing 32 supported in the superjacent frame portion. The drive shafts 16, 17 have their other end rigidly connected to the outermost mower members 4 on the supporting beam. Such a construction has the considerable advantage in that it prevents the so-called "piling" of the crop, i.e. the accumulation of crop against stationary frame portions. Also the embodiment shown in FIGS. 4 and 5 can be connected by means of a trestle 27 to a vehicle or be accommodated in a mowing machine which is drawn by a vehicle and wherein optionally also additional crop processing members, such as a crusher, are incorporated.

It will be obvious that the use of the above-described drive of the mower members, whereby the two outermost mowing members are driven directly and all the interposed mower members are interconnected in a flexible manner, allows for the advantageous distribution of the forces when, for example, one of the central mower members is all of a sudden loaded heavily, which extra load need only be taken in part by either of the drive shafts 16, 17. Therefore, an improved distribution of the drive forces is the result of the construction as described.

The invention is not limited to the features described in the foregoing and as claimed in the claims but also comprises any combination of measures as described in the description and as illustrated in the drawings.

Having disclosed my invention, what I claim is new and to be secured by Letters Patent in the United States is:

1. A closed drive mowing machine, comprising: at least three mower members which are arranged on a supporting beam having accommodated therein drive means for driving said mower members to rotate about substantially vertical axes, said supporting beam, during operation, extending substantially transversely to the direction of operative travel, said drive means being driven from both ends of said supporting beam by means of mechanically intercoupled secondary drive shafts, wherein said drive means includes a single rotatable torsion shaft extending through said supporting beam and carrying gear wheels for driving said mower members.

2. A mowing machine as claimed in claim 1, wherein said torsion shaft has an out-of-round cross-section and upon which are mounted slidable gear wheels having a complementary shaped center-hole.

3. A mowing machine as claimed in claim 2, wherein during operation, the supporting beam is located just above the soil, and said mower members are provided with discs arranged above said supporting beam.

4. A mowing machine as claim in claim 3, wherein the drive of said torsion shaft is provided by the two outermost said mower members arranged on said supporting beam.

5. A mowing machine as claimed in claim 4, wherein said outermost mower members are provided with upwardly extending drums for housing said secondary drive shafts for driving said torsion shaft.

6. A mowing machine as claimed in claim 4, wherein said supporting beam is connected to the remainder of the mowing machine's frame by means of said two secondary drive shafts, which also drive said torsion shaft.

7. A mowing machine as claimed in claim 6, wherein said torsion shaft is driven by a main drive shaft which extends substantially parallel to said supporting beam and drives said two secondary drive shafts positioned substantially perpendicular to said main drive shaft, each said secondary drive shaft providing drive to said torsion shaft near an end of said supporting beam.

8. A mowing machine as claimed in claim 7, wherein said secondary drive shafts include a flexible coupling.

9. A mowing machine as claimed in claim 7, wherein said main drive shaft is driven by gear wheels housed in a gear housing located between the connections to said secondary drive shafts.

10. A mowing machine as claimed in claim 9, wherein said main drive shaft consists of two sections which are substantially in alignment and are located on both sides of said gear housing and wherein said main drive shaft is driven by said gear wheels.

11. A mowing machine as claimed in claim 7, wherein said main drive shaft is driven by gear wheels in a gear housing located near an end of said drive shaft.

12. A mowing machine as claimed claim 9, wherein the mowing machine is provided with a crop processing implement.

13. A mowing machine as claimed in claim 12, wherein drum-shaped crop guides are mounted on said outermost mower members and said crop processing implement, measured in a direction transverse to the operative direction of travel of the mowing machine, is shorter than the length of said supporting beam.

14. A mowing machine as claimed in claim 9, wherein a frame portion is provided with wheels, said supporting beam being suspended such that it is capable of limited movement in said frame portion, and further comprising means for hitching the mowing machine to a tractor.

15. A mowing machine as claimed in claim 1, wherein said supporting beam is comprised of sections which are arranged against each other in the longitudinal direction of said supporting beam, said sections having at least a number including drive units for said mower members.

16. A mowing machine as claimed in claim 15, wherein said sections are retained in position by means of a tensile rod extending through all of said sections.

17. A moving machine as claimed in claim 16, wherein said tensile rod and said torsion shaft extending parallel thereto, both extending through said sections of said supporting beam, are removable, such that said sections of said supporting beam are removable and individually replaceable.

18. A mowing machine as claimed in claim 8, further comprising: a frame, said frame comprising a hollow tube for housing said main drive shaft; a trestle for attachment to a prime mover; and means for reinforceably connecting said hollow tube to said supporting beam.

19. A mowing machine as claimed in claim 17 wherein each said drive unit is provided with a slide shoe.

20. A closed drive mowing machine, comprising:
at least three mower members arranged on a horizontal supporting beam having accommodated therein drive means for driving each said mower member to rotate about a substantially vertical axis, said supporting beam, during operation, extending substantially transversely to the direction of operative travel;
a main drive shaft, said main drive shaft being housed in a hollow beam, said hollow beam being substantially above and parallel to said supporting beam;
two secondary drive shafts, an upper end of one said secondary drive shaft driveably connected transverse to each end of said main drive shaft;
a rotatable torsion shaft, said rotatable torsion shaft driveably connected at each end to a lower end of one of said two secondary drive shafts such that said rotatable torsion shaft is driven from both ends, said rotatable torsion shaft further carrying gear wheels comprising said drive means for driving said mower members.

21. A close drive mowing machine comprising:
a supporting beam;
at least three mowing members mounted on said supporting beam so as to be rotatable about substantially vertical axes;
a rotatable torsion shaft, said rotatable torsion shaft extending through said supporting beam and carrying a gear wheel meshably connected to each said mower member;
a substantially vertical secondary drive shaft, attached at a lower end to said mower member on each end of said supporting beam, each said secondary drive shaft providing drive to said rotatable torsion shaft by means of said mower member's meshable connection to said gear wheel mounted on said rotatable torsion shaft;
a main drive shaft, said main drive shaft extending substantially above and parallel to said supporting beam, one of said secondary drive shafts being driveably connected to and extending perpendicularly from each end of said main drive shaft;
means for driving said main drive shaft; and
means for attaching the mowing machine to a prime mover.

* * * * *